E. SAVAGE.
Theading Screws.
No. 11,974.
2 Sheets—Sheet 1.
Patented Nov. 21, 1854.
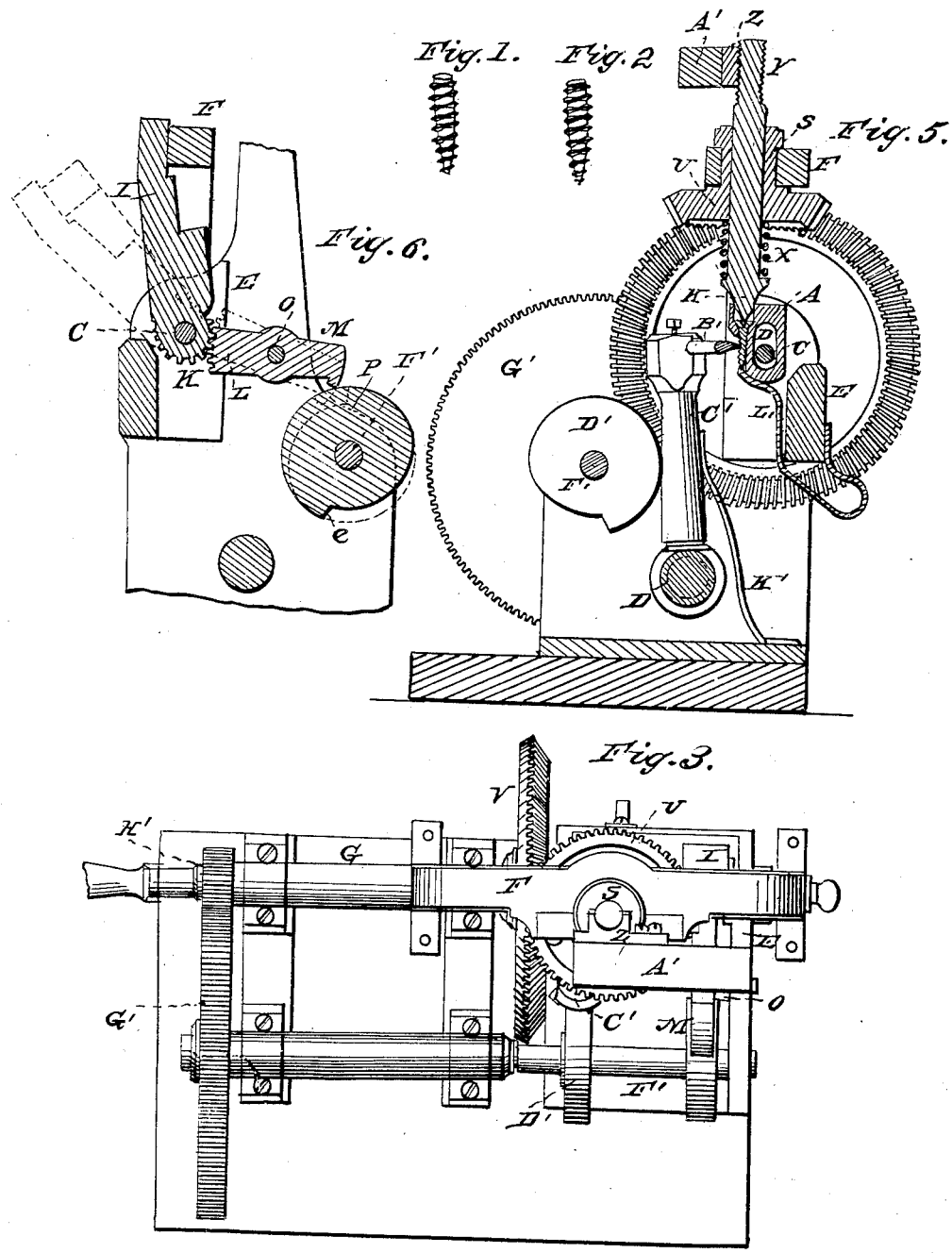

E. SAVAGE.

Theading Screws

No. 11,974.

2 Sheets—Sheet 2.

Patented Nov. 21, 1854.

UNITED STATES PATENT OFFICE.

ELLIOT SAVAGE, OF BERLIN, CONNECTICUT.

IMPROVEMENT IN MACHINES FOR THREADING SCREW-BLANKS.

Specification forming part of Letters Patent No. 11,974, dated November 21, 1854.

*To all whom it may concern:*

Be it known that I, ELLIOT SAVAGE, of Berlin, in the county of Hartford and State of Connecticut, have invented a new and useful or Improved Machine for Threading Screw-Blanks; and I do hereby declare that the same is fully described and represented in the following specification and the accompanying drawings, letters, figures, and references thereof.

The object of my invention is to form the tail end of a screw with a point which is conical or closely approximating to a cone. In ordinary screw-blank-threading machines the cutting-tool is made movable toward the axis of the blank during the operation of forming the tail end of the blank and the screw-thread of such part of the blank. The consequence is that the external surface of the tail end of the body as it diminishes toward its extreme end remains parallel to the axis of the screw, whereas by my improvement it is oblique thereto, and is formed in the arc of a circle, as will be hereinafter explained.

Figure 4:
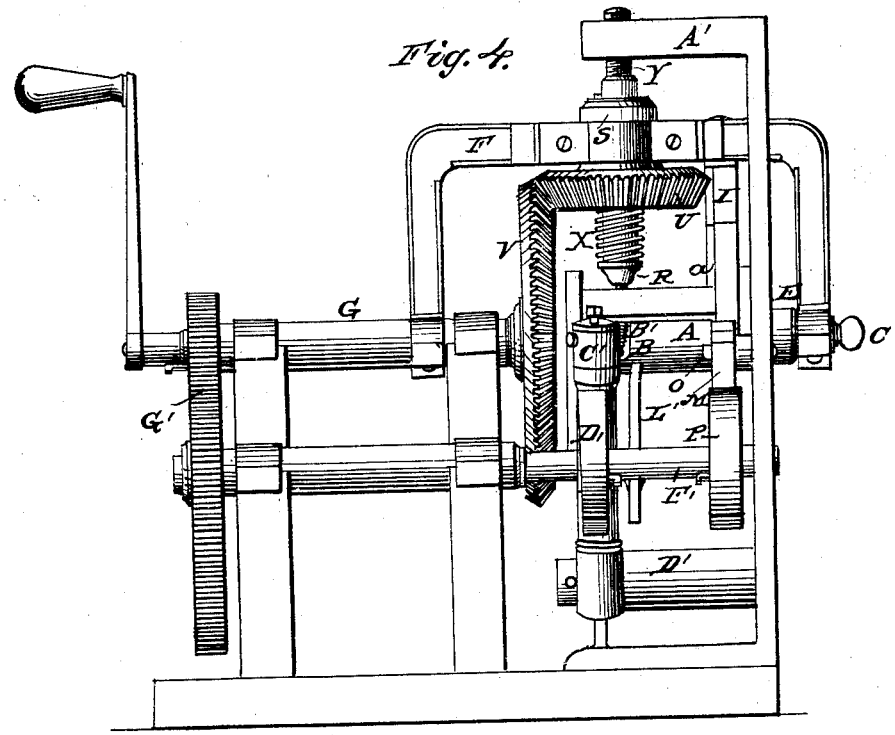
Figure 7:
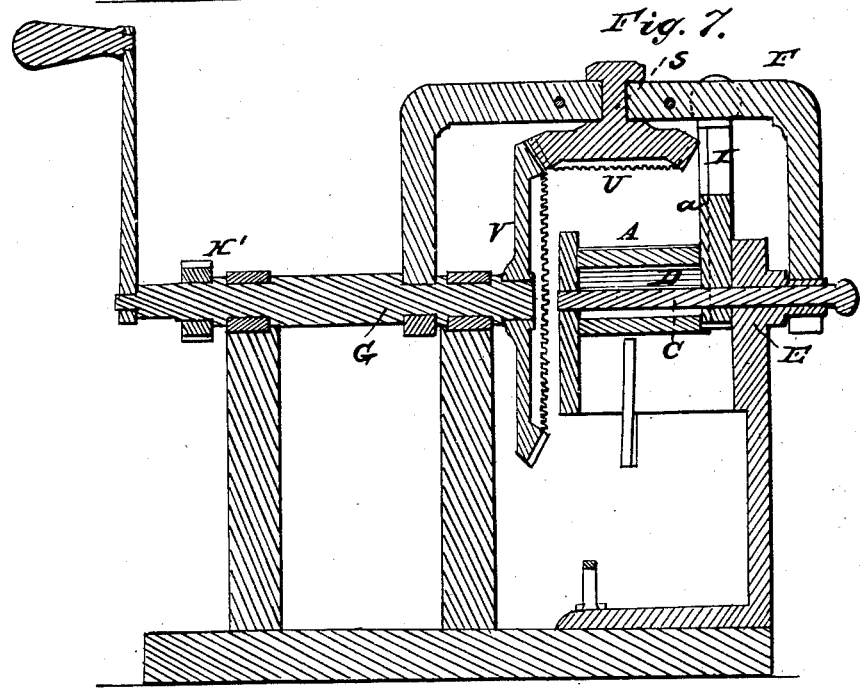

Figure 1 of the drawings exhibits a side view of the pointed end of a screw-blank cut in my improved manner. Fig. 2 is a similar view of one formed in the common way. My method of forming the tapering end of the blank terminates the screw-thread at the axis of the blank, whereas as such thread is formed, as shown in Fig. 2, it scarcely ever is terminated at the said axis. Fig. 3 is a top view of my said machine. Fig. 4 is a front elevation of it. Fig. 5 is a vertical and transverse section of it, taken through the screw-driver and so as to exhibit the tool-post and its cam. Fig. 6 is a vertical and transverse section of the machine, the same being taken through the cam and mechanism by which the screw rest or carriage is turned while the point or tail end of the blank is being cut and threaded. Fig. 7 is a vertical and longitudinal section of the machine, it being taken through the middle of the screw rest or carriage.

In the drawings, A denotes the screw rest or carriage which carries the screw-blank B during the operation of threading it. The socket or place for the reception of the screw-blank is formed in the front of the said carriage or rest, as seen in the drawings, aside and at a short distance from the axis thereof. The axis thereof during the formation of the pointed end of the screw-blank corresponds with that of the horizontal pin or shaft C, on which the screw-holder is placed, the said pin passing through screw-holder or a passage D formed through the same, such passage being shaped in vertical and transverse section, as seen in Fig. 5. The said pin is supported by the frame-work E, and constitutes a journal for a yoke or frame F to turn upon, the frame being also supported and made to turn upon a driving-shaft G placed in range of the said pin. There is a lever I disposed upon the shaft C and made to turn thereon. The lower end of such lever is formed with a semicircle or arc of cogs or teeth, as seen at K, which is made to engage with the teeth L of a sectoral lever M, that turns upon a fulcrum O and rests against and is operated by a cam P.

The upper end of the lever I abuts against the rear side of the yoke, and on the inner side of said lever there is formed a projecting rail or slide *a*, on which the screw-blank carriage moves, and by which it is guided in a vertical direction when it is made to descend during the operation of making the thread on the cylindrical part of the screw-blank. There is applied to the carriage a screw-driver R, that slides freely up and down through a tubular shaft S, which is supported by and made to rotate in the yoke, and is put in rotation by two bevel-gears U V, one of which is fixed on the shaft S and the other on the driving-shaft. The screw-driver should be applied to the tubular shaft S by a spline or feather connection, or such a one as will permit it to be moved longitudinally through the same and cause it to be rotated by said tubular shaft. The said screw-driver is forced down into the neck or grooves of the head of the screw-blank by means of a spring *x*, and it has a screw *y* formed upon its upper end, the pitch of the thread of such screw being made to correspond with that to be formed on the screw-blank. This screw operates in connection with a semi-female screw or stationary chaser *z*, that is fixed upon an arm A', extending upward from the main frame.

The screw chaser or cutter is shown at B' as affixed to the upper end of a tool-post or turning lever C', that turns on a fulcrum D' and is moved toward and away from the screw-blank rest or carriage. The movement of the said tool-post or lever toward the carriage is effected by the action of the cam D' fixed upon a cam-shaft F', that receives its motion from the main driving-shaft by gearing, as seen at D' and H'. The backward movement of the tool-post is produced by a spring K'. There is another spring L, that is applied to the main frame-work and made to press against the under side of the screw-blank rest or carriage, such last-named spring being for the purpose of elevating the said carriage after it has been depressed by the screw of the upper end of the screw-driver.

The above may be said to constitute the prominent features or the principal operative parts of my said machine. In threading a screw-blank by it the said blank is put in place in the carriage or rest, when it and the yoke are inclined in the positions as represented by dotted lines in Fig. 6. After this has been accomplished and the main shaft put in operation the tool will be moved up against the lower extremity of the axis of the screw-blank. As soon as this is done the screw-blank carriage commences to turn or rotate transversely, while the screw-blank is in rotation on its axis. Such a movement of the screw-blank carriage continues until the screw-blank is brought into a vertical position, or until the screw at the upper end of the screw-driver enters its female screw. As soon as such takes place the action of such screw in such female screw will depress the screw driver and carriage and cause the screw-thread to be cut on the main body or cylindrical part of the screw-blank. As soon as such screw has been completed the proper distance the front end of the sectoral lever before mentioned passes by and over the drop or part $i$ of its cam. This at once releases the lever so as to allow the yoke to fall back into the inclined position, as represented in dotted lines in Fig. 6.

In other screw-threading machines the chaser or cutter is moved, while the holder of the screw-blank remains stationary and the blank is rotated therein. In my machine the chaser is stationary, while the screw-blank holder is turned and moved downward.

What therefore I claim as my invention is—

In the above-described screw-threading machine, the manner in which its screw-blank rest or carriage is moved in order to form a conical or approximately conical or tapering end to the tail part of the screw-blank, in connection with a cylindrical body and a helix or screw-thread thereon, such movement consisting in turning the screw-blank with respect to the chaser, and subsequently causing it to descend in a vertical line, all substantially as hereinbefore explained.

In testimony whereof I have hereunto set my signature this 4th day of September, A. D. 1854.

ELLIOT SAVAGE.

Witnesses:
 ALFRED NORTH,
 JAMES B. CARPENTER.